US012693244B2

(12) United States Patent
N'Guyen et al.

(10) Patent No.: US 12,693,244 B2
(45) Date of Patent: Jul. 28, 2026

(54) DEVICE FOR ANALYZING A FLUID IN A SAMPLE AND RELATED METHOD

(71) Applicant: TotalEnergies OneTech, Courbevoie (FR)

(72) Inventors: Michel N'Guyen, Paul (FR); Cyril Caubit, Paul (FR)

(73) Assignee: TotalEnergies OneTech, Courbevoie (FR)

( * ) Notice: Subject to any disclaimer, the term of this patent is extended or adjusted under 35 U.S.C. 154(b) by 341 days.

(21) Appl. No.: 18/276,744

(22) PCT Filed: Sep. 17, 2021

(86) PCT No.: PCT/EP2021/075615
§ 371 (c)(1),
(2) Date: Aug. 10, 2023

(87) PCT Pub. No.: WO2022/172047
PCT Pub. Date: Aug. 18, 2022

(65) Prior Publication Data
US 2024/0125715 A1      Apr. 18, 2024

(30) Foreign Application Priority Data
Feb. 12, 2021    (WO) .................. PCT/IB2021/000086

(51) Int. Cl.
G01N 23/083          (2018.01)
(52) U.S. Cl.
CPC ..... G01N 23/083 (2013.01); G01N 2223/206 (2013.01); G01N 2223/303 (2013.01);
(Continued)

(58) Field of Classification Search
CPC ........... G01N 23/083; G01N 2223/206; G01N 2223/303; G01N 2223/3303;
(Continued)

(56) References Cited

U.S. PATENT DOCUMENTS

| 10,302,578 B2 | 5/2019 | Li et al. |
| 2013/0018641 A1 | 1/2013 | Prisco et al. |
(Continued)

FOREIGN PATENT DOCUMENTS

| CN | 103806905 A | 5/2014 |
| EP | 3 227 677 A0 | 6/2016 |
(Continued)

OTHER PUBLICATIONS

International Search Report issued in International Patent Application No. PCT/EP2021/075615 dated Jan. 18, 2022.
(Continued)

*Primary Examiner* — David P Porta
*Assistant Examiner* — Mamadou Faye
(74) *Attorney, Agent, or Firm* — Troutman Pepper Locke LLP

(57) ABSTRACT

The device includes a first X-ray source, configured to illuminating a measurement cell with a first beam of X photons; a first detector, placed opposite the first X-ray source along a first illumination axis; a second X-ray source, configured to illuminating the measurement cell with a second beam of X photons simultaneously with the first X-ray source; a second detector, placed opposite the second X-ray source along a second illumination axis; and a tray carrying the first X-ray source, the first detector, the second X-ray source, and the second detector, the tray being rotatable around the cell axis.

20 Claims, 8 Drawing Sheets

(52) U.S. Cl.
     CPC ................ *G01N 2223/3303* (2013.01); *G01N 2223/501* (2013.01)

(58) Field of Classification Search
     CPC ........... G01N 2223/501; G01N 23/087; G01N 23/12; G01N 2223/308; G01N 2223/31; G01N 2223/419; G01N 2223/605; G01N 23/046
     See application file for complete search history.

(56)                 References Cited

U.S. PATENT DOCUMENTS

| | | |
|---|---|---|
| 2014/0086385 A1 | 3/2014 | Creux et al. |
| 2017/0115200 A1 | 4/2017 | Chen et al. |
| 2017/0131223 A1* | 5/2017 | Hild ..................... G01N 23/046 |
| 2018/0203155 A1* | 7/2018 | Poulsen ................. G01V 5/224 |

| | | |
|---|---|---|
| 2019/0056376 A1 | 2/2019 | Youssef et al. |
| 2021/0010923 A1* | 1/2021 | Sokawa ............... G01N 23/046 |
| 2022/0110525 A1* | 4/2022 | Seifert ................. G01N 21/255 |

FOREIGN PATENT DOCUMENTS

| | | |
|---|---|---|
| WO | 2011/119045 A1 | 9/2011 |
| WO | 2016/087890 A1 | 6/2016 |

OTHER PUBLICATIONS

International Search Report issued in International Patent Application No. PCT/IB2021/000086 dated Jan. 18, 2022.
SPE 142618 Alajmi, A. F., "Modeling the Oil Bank Formation during Steam Flood" Society of Petroleum Engineers, pp. 1-7 (2011).
SPE 155633 Simjoo, M., et al. "A CT Scan Study of Immiscible Foam Flow in Porous Media for EOR" Society of Petroleum Engineers, pp. 1-19 (2011).

* cited by examiner

DEVICE FOR ANALYZING A FLUID IN A SAMPLE AND RELATED METHOD

CROSS REFERENCE TO RELATED APPLICATIONS

The present application is a U.S. National Phase Application under 35 U.S.C. § 371 of International Patent Application No. PCT/EP2021/075615 filed Sep. 17, 2021, which claims priority of International Patent Application No. PCT/162021/000086 filed Feb. 12, 2021. The entire contents of which are hereby incorporated by reference.

BACKGROUND

The present invention concerns a device for analyzing a fluid in a sample, comprising:
- a measurement cell capable of receiving a sample of porous medium containing a fluid comprising one or more phases, the measurement cell extending along a cell axis;
- a first X-ray source, capable of illuminating the measurement cell with a first beam of X photons, the first beam extending along a first illumination axis;
- a first detector, placed opposite the first X-ray source along the first illumination axis, the measurement cell being interposed between the first X-ray source and the first detector, the first beam being capable of illuminating at least a volume of the sample without relative movement between the first X-ray source and the sample, the first detector comprising a plurality of sensing areas capable of detecting X photons arising from different points in the volume of the sample.

The device is intended in particular for studying a multiphase fluid flow in an opaque porous medium such as a core of rock, by using X-rays.

Such a device advantageously collects data to calculate local properties of the fluid in the porous medium at different positions in the porous medium, in particular for discriminating among the different phases of the fluid permeating the medium at the different positions. The device is able to obtain local proportions or saturations of the different phases at each position.

Such an analysis is generally carried out in a rock sample, to simulate fluid permeation and/or migration in a fluid bearing formation located underground.

In known devices, a sample of a porous medium containing fluid is inserted in a cell. An X-ray source is placed on one side of the sample and a punctual detector is positioned on the other side of the sample. X-rays are emitted by the source, go through the sample at a punctual position on the sample, and are recovered by the detector. The detector detects a photon count. Depending on the absorbance of the sample, the fluid content at the measurement point can be determined, for example using Beer-Lambert law.

In order to get information at different positions of the sample, successive punctual measurements are carried out along the axis of the sample, by moving the sample relatively to the source and detector.

Such a method is tedious to operate. It has a long acquisition time. The visualization of the sample can be carried out only along a line along the central axis of the sample with a punctual determination at each point along the line.

In order to obtain an improved visualization of fluid content, it is known to obtain bi-dimensional or even tri-dimensional images of the sample using a CT scanner, based on medical imaging devices.

Examples of such scanners are disclosed in the articles SPE 142618 and SPE 155633.

Medical imaging-based CT scanners are however not adapted to measurements of porous media having small differences in phase composition. Indeed, the porous medium containing the fluid is very opaque and the fluid has an attenuating power much lower than the solid matrix receiving the fluid.

Moreover, the effect of the difference in phase content of the fluid (e.g. liquid versus gas, and within the liquid, oil phase versus water phase) on the signal collected at the detector is very low and almost negligible in comparison with the effect of the solid matrix containing the fluid on the signal.

In addition, in a medical based CT scanner, the sample is maintained horizontally, which disturbs the flow of the fluid introduced in the sample.

In order alleviate these problems and to increase the signal to noise ratio, a known solution is the addition, in the fluid, of at least a contrast agent specific to one or more phase of the fluid.

However, the addition of one or more contrast agents usually changes the physical-chemical properties of the fluid, in particular its wettability in the porous sample. The fluid may thus have a very different behavior in the analyzing device than in actual underground formations, where it does not contain contrast agent. This may skew the experimental results.

One aim of the invention is to obtain a device that is able to provide a three-dimensional visualization of a fluid permeating into a porous medium at chosen pressure and temperature, and which allows a clear-cut discrimination between different phases of the fluid, without adding contrast agent in the fluid.

SUMMARY

To this end, the invention relates to a device as described above, characterized by:
- a second X-ray source, capable of illuminating the measurement cell with a second beam of X photons simultaneously with the first X-ray source, the second beam extending along a second illumination axis distinct from the first illumination axis;
- a second detector, placed opposite the second X-ray source along the second illumination axis, the measurement cell being interposed between the second detector and the second X-ray source, the second X-ray source being capable of illuminating at least a volume of the sample, without relative movement between the second X-ray source and the sample, the second detector comprising a plurality of sensing areas capable of detecting X-rays arising from different points in the volume of the sample, simultaneously with the first detector;
- a tray carrying the first X-ray source, the first detector, the second X-ray source, and the second detector, the tray being rotatable around the cell axis.

The device according to the invention may comprise one or more of the following feature(s), taken solely or according to any technical feasible combination:

the tray in rotatable around the cell axis over an angular range smaller than 380° and advantageously comprised between 350° and 370°;

the angle defined by the first illumination axis and the second illumination axis in a plane perpendicular to the cell axis is comprised between 70° and 110°, in particular between 80° and 100°;

the first X-ray source comprises a first controller, capable of controlling the energy of the X photons of the first beam to a first maximum energy, the second X-ray source comprising a second controller, capable of controlling the energy of the X photons of the second beam to a second maximum energy distinct from the first maximum energy;

the cell axis of the measurement cell is vertical;

the first beam and the second beam are able to illuminate the whole sample contained in the measurement cell without relative movement between the first and second X-ray sources and the sample, the first detector and the second detector comprising sensing areas able to detect X-rays arising from points spread in the volume of the sample and outside of the sample;

the first X-ray source and the second X-ray source are permanently active;

the fluid comprises at least a liquid phase and a gas phase, preferentially at least an oil phase, a water phase and a gas phase, the device comprising an analysis unit able to determine a phase composition of the fluid at a plurality of positions in the sample, based on signals simultaneously detected by sensing areas of the first detector and of the second detector;

the analysis unit comprises a calculator able to acquire sensed data detected by sensing areas of the first detector and of the second detector taken at successive angular measurement positions of the tray around the cell axis and to form a three-dimensional map of fluid composition in the sample based on the signals acquired at the successive angular measurement positions of the tray;

the first detector and the second detector each comprise a bi-dimensional array of sensing areas capable of selectively detecting X photons arising from different points of the volume of the sample without relative movement between the first and second X-ray sources and the sample;

at least one of the first detector and the second detector comprises a shield assembly to attenuate diffused photons arising from the at least one of the first detector and the second detector;

the measurement cell contains, in addition to the sample, at least a calibration block having a through orifice able to be filled with the fluid which flows in the measurement cell to impregnate the sample or/and which flows out of the measurement cell from the sample, the first beam and the second beam being capable of illuminating the through orifice simultaneously with the sample without relative movement between the first X-ray source, the second X-ray source and the sample.

The invention also relates to a method for analyzing a fluid in a sample, comprising:

a device as defined above, the measurement cell containing a sample of porous medium containing fluid;

simultaneous illumination of at least a volume of the sample by the first beam and by the second beam, at least one angular measurement position of the tray around the cell axis;

selectively detecting X-rays arising respectively from the first beam and from the second beam at a plurality of sensing areas of respectively the first detector and the second detector to obtain first sensed data sensed by the first detector and second sensed data sensed by the second detector;

determining a local property of the fluid at a plurality of positions in the sample, based on the first sensed data and on the second sensed data.

The method according to the invention may comprise one or more of the following feature(s), taken solely or according to any technical feasible combination:

the method comprises rotating the tray at a plurality of successive angular measurement positions around the cell axis, and for each angular measurement position repeating the steps of:

simultaneous illumination of at least a volume of the sample by the first beam and by the second beam;

selectively detecting X-rays arising respectively from the first beam and from the second beam at a plurality of sensing areas of respectively the first detector and the second detector to obtain first sensed data sensed by the first detector and second sensed data sensed by the second detector;

the method comprising calculating a local property of the fluid at a plurality of tridimensional positions in the sample, based on the first sensed data and on the second sensed data obtained at the plurality of successive angular measurement positions;

the method comprises acquiring, at successive measurement times, first sensed data from the first detector, and second sensed data from the second detector, without rotation of the tray around the rotation axis;

the method comprises controlling the first X-ray source to emit a first beam having a first maximum energy, and simultaneously controlling the second X-ray source to emit a second beam with a second maximum energy different from the first maximum energy, the method further comprising determining a composition in at least three phases of the fluid, at a plurality of position in the volume of the sample based on the first sensed data and on the second sensed data.

The invention also concerns a device for analyzing a fluid in a sample, comprising:

a measurement cell capable of receiving a sample of porous medium containing a fluid comprising one or more phases, the measurement cell extending along a cell axis;

a first X-ray source, capable of illuminating the measurement cell with a first beam of X photons, the first beam extending along a first illumination axis;

a first detector, placed opposite the first X-ray source along the first illumination axis, the measurement cell being interposed between the first X-ray source and the first detector, the first beam being capable of illuminating at least a volume of the sample without relative movement between the first X-ray source and the sample, the first detector comprising a plurality of sensing areas capable of detecting X photons arising from different points in the volume of the sample;

the first X-ray source and the first detector being rotatable with regards to the measurement cell around the cell axis;

the fluid comprising at least a liquid phase and a gas phase, preferentially at least an oil phase, a water phase and a gas phase, the device comprising an analysis unit able to determine a composition of the fluid at a plurality of positions in the sample, based on sensed data detected by sensing areas of the first detector;

the analysis unit comprising a calculator able to acquire the sensed data detected by sensing areas of the first detector, taken at successive angular measurement positions around the cell axis, the calculator being able to determine at each successive angular position around the cell axis, at least a bi-dimensional map of fluid composition in the sample;

the calculator being able to form a three-dimensional map of fluid composition in the sample from the successive bi-dimensional map of fluid composition in the sample.

The device does not necessarily comprise a second X-Ray source, a second detector and a tray as defined above. It may however comprise one or more of the above-mentioned features, taken alone or according to any technical feasible combination.

In a preferred embodiment, the analysis unit is able to calculate a back projection of each bi-dimensional map at each angular position around the cell axis, in the volume occupied by the sample and to sum the calculated back projections in the volume occupied by the sample to obtain the three-dimensional map.

The invention also relates to a method for analyzing a fluid in a sample, comprising:

a device as defined above, the measurement cell containing a sample of porous medium containing fluid;

the method comprises rotating the tray at a plurality of successive angular measurement positions around the cell axis, and for each angular measurement position repeating the steps of:

simultaneous illumination of at least a volume of the sample by the first beam;

selectively detecting X-rays arising respectively from the first beam at a plurality of sensing areas of the first detector to obtain first sensed data sensed by the first detector;

the method comprising calculating a local property of the fluid at a plurality of tridimensional positions in the sample, based on the first sensed data obtained at the plurality of successive angular measurement positions;

the device comprising an analysis unit having a calculator, the calculator acquiring the sensed data detected by sensing areas of the first detector, taken at successive angular measurement positions around the cell axis, the calculator determining at each successive angular position around the cell axis, at least a bi-dimensional map of fluid composition in the sample;

the calculator forming a three-dimensional map of fluid composition in the sample from the successive bi-dimensional map of fluid composition in the sample.

In a preferred embodiment, the calculator calculates a back projection of each bi-dimensional map at each angular position in the volume occupied by the sample and sums the calculated back projections in the volume occupied by the sample to obtain the three-dimensional map.

BRIEF DESCRIPTION OF THE DRAWINGS

The invention will be better understood upon reading of the following description, given solely as an example, and made in reference to the appended drawings, in which.

6

Figure 1:
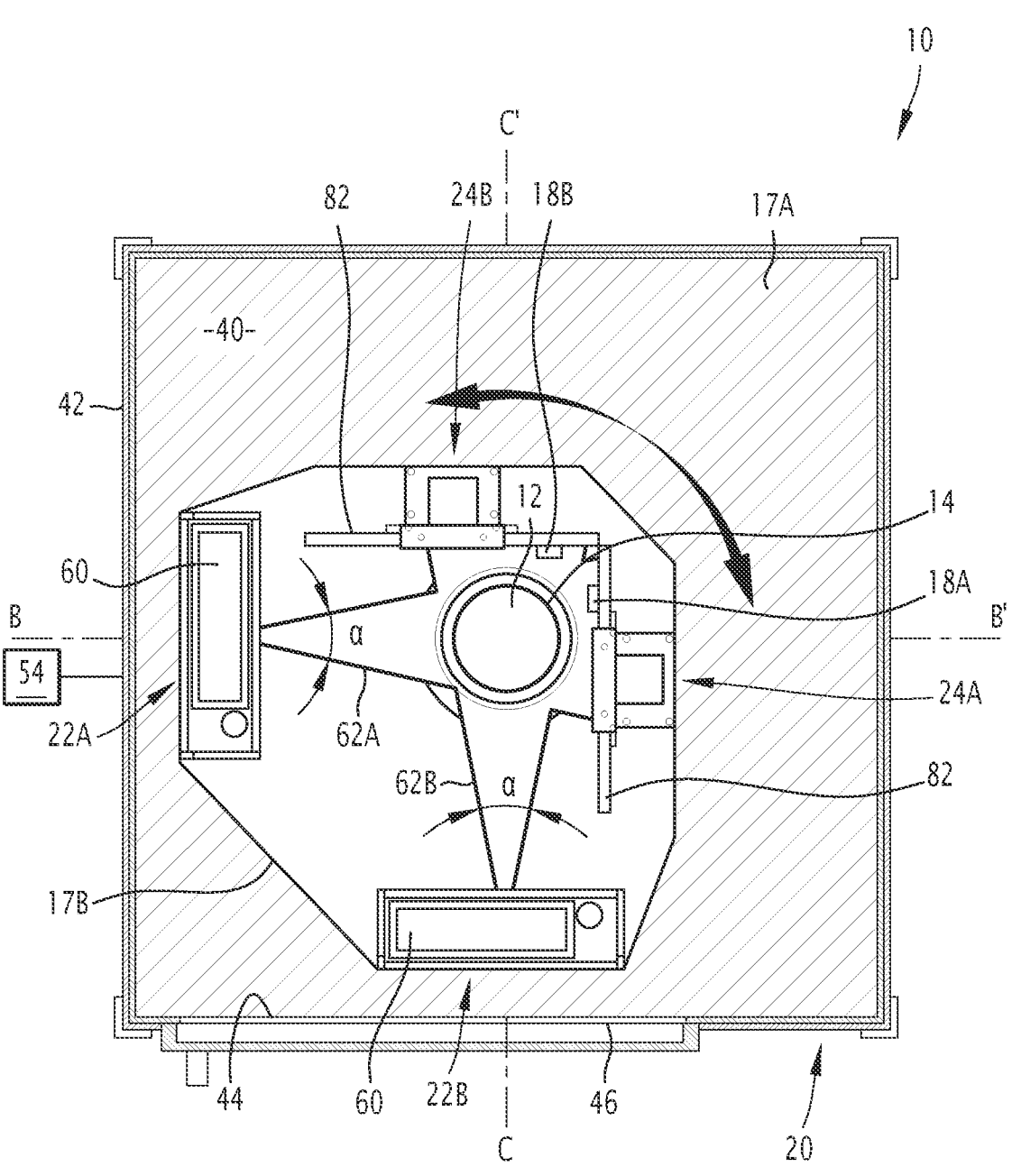
FIG. 1 is a top schematic view of a first device for analyzing a fluid in a sample of porous medium according to the invention.
Figure 3:
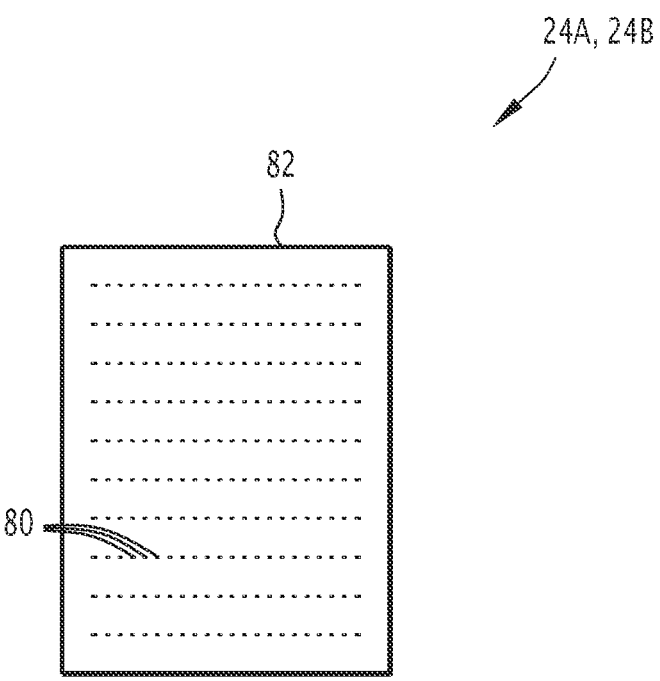
Figure 4:
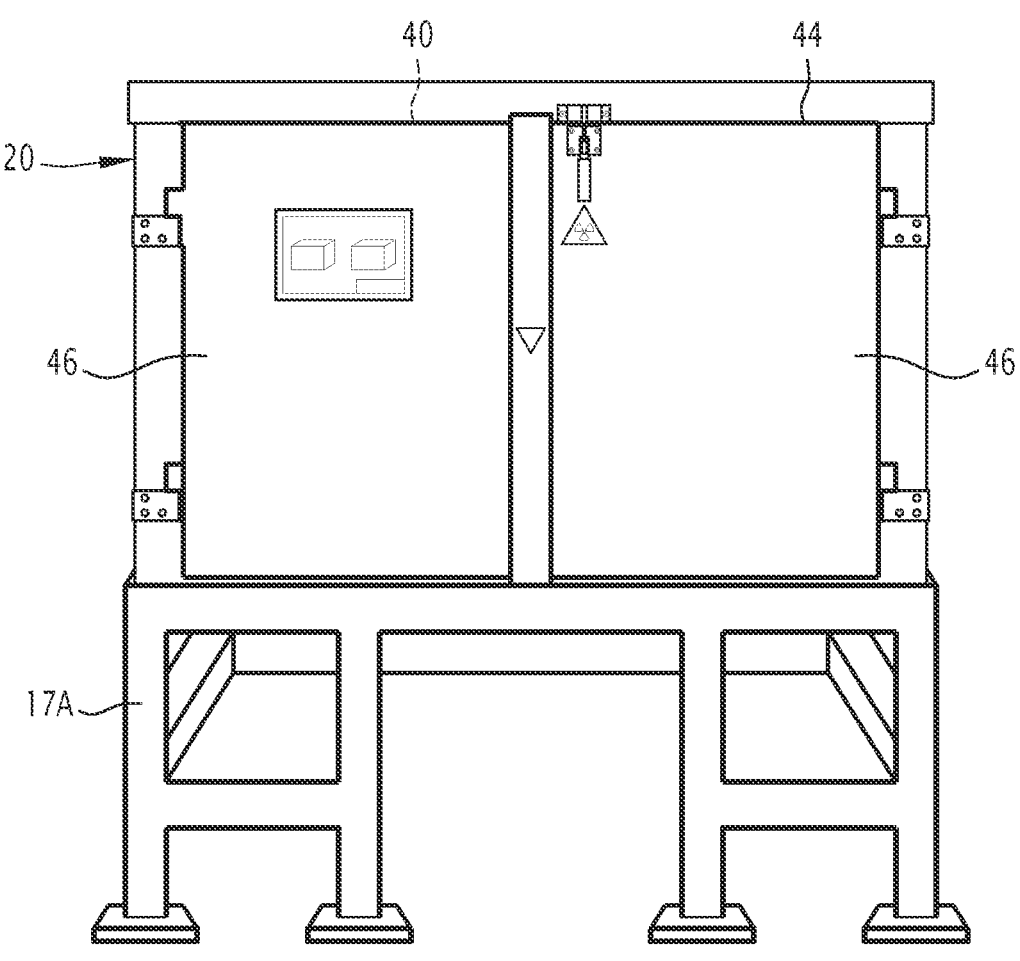
Figure 5:
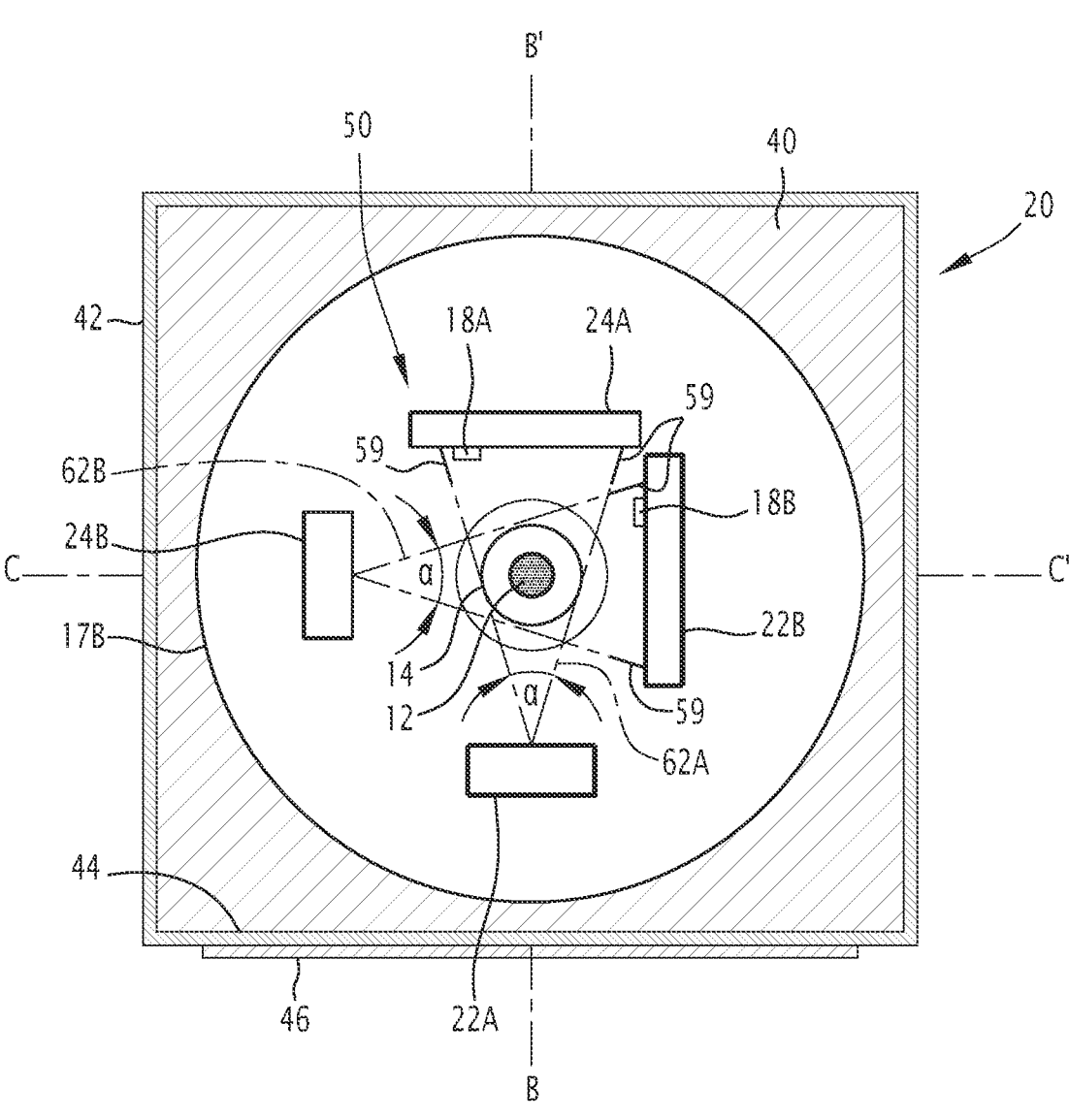
Figure 6:
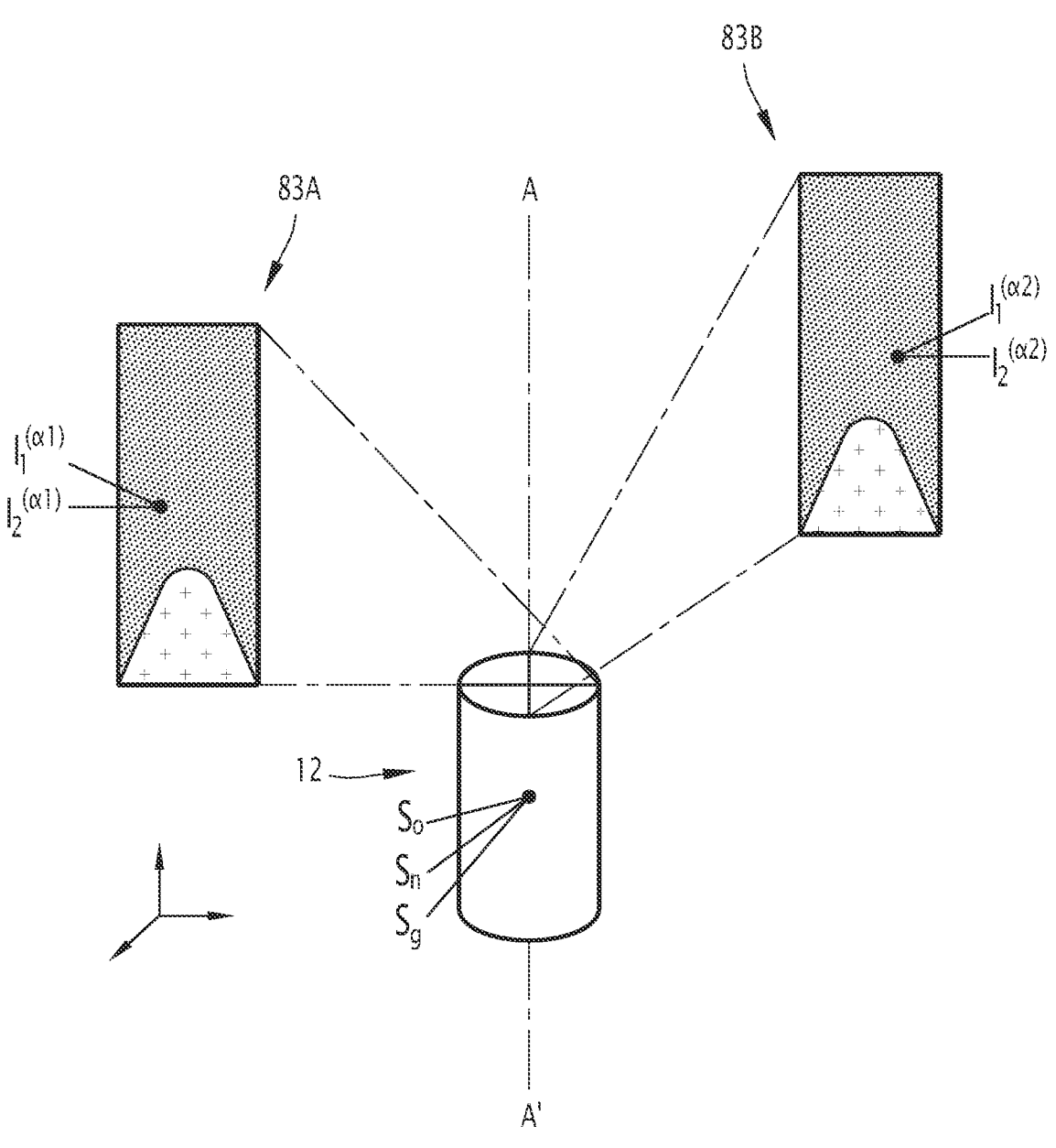
Figure 7:
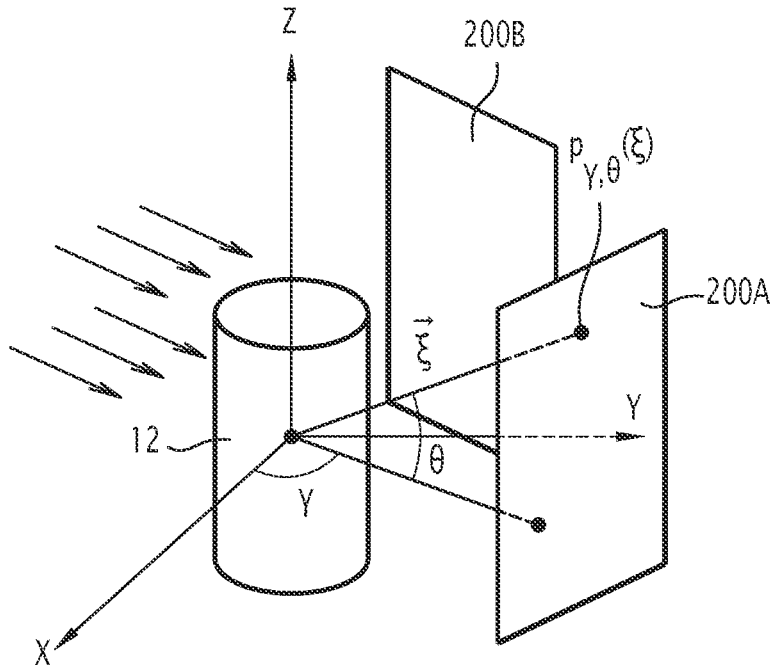
Figure 8:
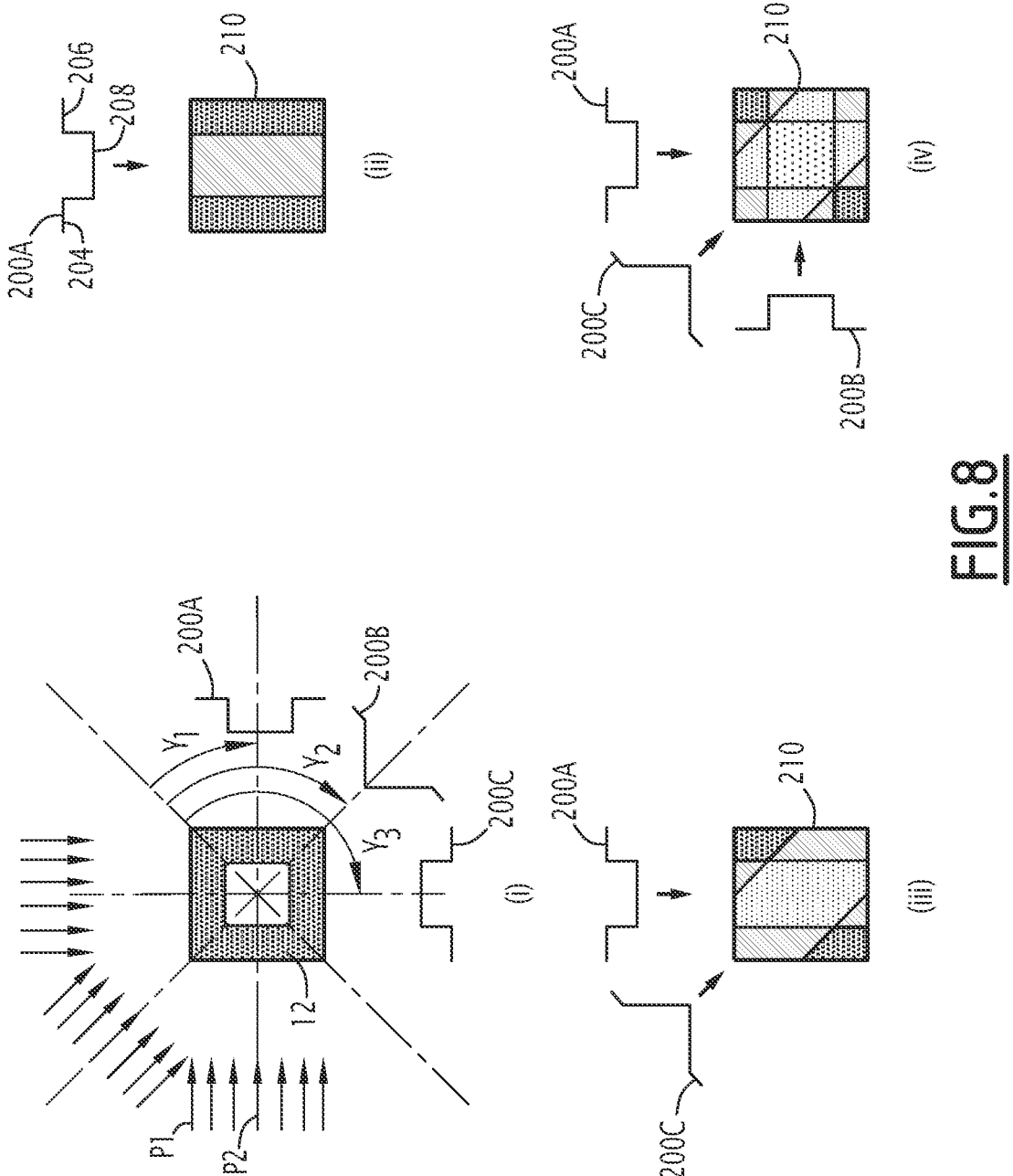

FIG. 3 is a view of a detector used in the device of FIG. 1;

FIG. 4 is a view in elevation of an enclosure able to contain the measurement cell, the sources and the detectors of the device of FIG. 1;

FIG. 5 is a view similar to FIG. 1, illustrating shields to protect the detectors against diffused X-rays;

FIG. 6 is a schematic view of a three-dimensional mapping of a porous sample containing fluid measured with the device according to the invention;

FIG. 7 illustrates a projection of the first beam in the plane of the first detector, used for determining a bi-dimensional map of fluid compositions; and FIG. 8 schematically illustrates the back projection of bi-dimensional maps at each angular position in the volume occupied by the sample the sum the calculated back projections in the volume occupied by the sample to obtain the three-dimensional map.

DETAILED DESCRIPTION

A first analysis device 10 according to the invention is illustrated in FIG. 1. The device 10 is for analyzing a fluid behavior in a porous medium, such as in a rock or sediment sample comprising pores.

Figure 2:
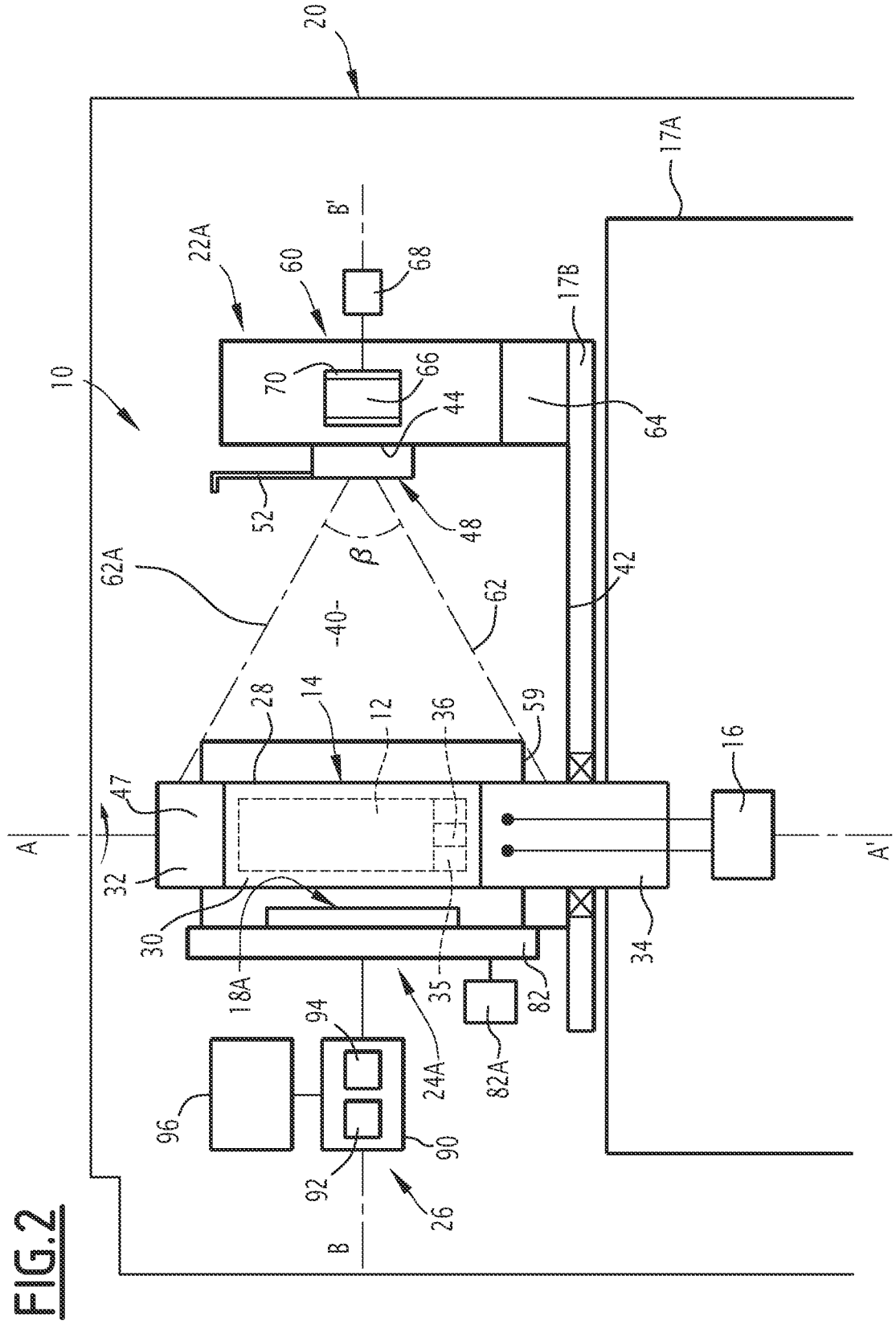
FIG. 2 is a schematic side view of the device of FIG. 1.

The sample 12 is shown in FIG. 2. It has a porosity generally comprised between 0% and 99%.

The sample 12 has for example a height of more than 1 cm and comprised between 10 cm and 50 cm in a particular embodiment. It has a diameter greater than 20 mm, generally comprised between 50 mm and 100 mm.

The device 10 allows for example the determination of a local property of the fluid at various positions in the sample 12 in a tridimensional reference frame.

The determination can be carried out for example during permeation of the fluid into the pores of the porous sample 12.

The fluid is for example a multiphase fluid, such as a hydrocarbonaceous fluid comprising a gas phase and a liquid phase. The liquid phase advantageously comprises a water phase and an oil phase.

In one typical analysis, the fluid is injected at a first point in the sample 12, for example at one end of the sample 12. The evolution of fluid permeation along the sample 12 is assessed by the device 10 according to the invention, by measuring local properties of the fluid, such as proportions in the different phases, at different positions in the tridimensional reference frame, at several successive measurement times.

The proportions in at least two phases (in particular liquid phase and gas phase) can be determined at each tridimensional position in the porous sample. In an advantageous embodiment, the proportions in three phases (water phase, oil phase and gas phase) can be determined at each tridimensional position in the porous sample.

The device 10 determines the proportions, preferentially without using contrast agent(s) in the fluid, in particular without any contrast agent in any of the phases of the fluid.

The permeation of the fluid is monitored in specific pressure and temperature conditions, which are controlled in the device 10 according to the invention. These temperature and pressure conditions generally correspond to the temperature and pressure in a subterranean formation containing oil and gas.

In a preferred embodiment, the pressure to which the sample 12 is submitted is comprised between 0 bars and 800 bars, for example between 200 bars and 650 bars. The temperature to which the sample 12 is submitted is comprised between 0° C. and 160° C., in particular between 50° C. and 120° C.

In reference to FIGS. 1 and 2, the device 10 comprises a measurement cell 14 containing the porous sample 12, having a vertical cell axis A-A', and a unit 16 for controlling temperature and/or pressure into the measurement cell 14.

The device 10 comprises a fixed supporting frame 17A placed around the measurement cell 14 and a rotatable tray 17B, rotably mounted on the frame 17A around the cell axis A-A'.

The device 10 also comprises a first X-ray source 22A, placed on a first side of the tray 17B and a first detector 24A located on an opposite side of the tray 17B, opposite the first X-ray source 22A. The measurement cell 14 is placed between the first X-ray source 22A and the first detector 24A along a first axis B-B' of illumination.

The device 10 further comprises a second X-ray source 22B, placed on a second side of the tray 17B and a second detector 24B located on an opposite side of the tray 17B, opposite the second X-ray source 22B. The measurement cell 14 is placed between the second X-ray source 22B and the second detector 24B along a second axis C-C' of illumination, which is advantageously perpendicular to the first axis B-B'.

The angle defined by the first illumination axis B-B' and the second illumination axis C-C' in a plane perpendicular to the cell axis A-A' is comprised between 70° and 110°, in particular between 80° and 100°. It is here equal to 90°.

The device 10 additionally comprises a reference sample 18A, 18B associated with each detector 24A, 24B, and an enclosure 20 containing the measurement cell 14, the tray 17B, the sources 22A, 22B and the detectors 24A, 24B borne by the tray 17B.

The device 10 further comprises an analyzing unit 26 able to receive the measurements made by the detector 24 and to determine at least a local property of the fluid in the sample.

The measurement cell 14 is shown in FIG. 2. It comprises a hollow container 28 defining a sample receiving cavity 30. It also comprises at least one plug 32, 34 closing the sample receiving cavity 30.

In the example of FIG. 2, the hollow container 28 is tubular. It is for example made of a material more transparent to X-ray than the sample 12 it contains. The material is for example carbon. Here, the sample 12 is cylindrical. In a variant, the sample 12 is a parallelepiped.

In FIG. 2, the measurement cell 14 comprises a central tubular part containing the sample 12 and two end parts closed by the plugs 32, 34.

The plugs 32, 34 seal the cavity 30 in an impervious manner.

Preferably, the hollow container 28 contains, at least one end of the cavity 30, a calibration block 35 defining a through orifice 36 able to be filled with the fluid which flows in the cavity 30 to impregnate the sample 12 or/and which flows out of the cavity form the sample 12

The calibration block 35 is preferably placed in contact with the sample 12. It advantageously has the same transverse dimensions and the same outer shape as the sample 12.

The through orifice is here linear. It extends along the cell axis A-A'. Its transverse dimension (here its diameter) is greater than 5% of the transverse dimension of the sample 12.

The unit 16 is able to control the temperature and the pressure of the sample 12 in the cavity 30. It is for example able to maintain the atmospheric pressure or to apply a pressure higher than the atmospheric pressure, for example of more than 50 bars, in particular of more than 100 bars and for example comprised between 0 bars and 800 bars, for example between 200 bars and 650 bars.

It is also able to maintain a temperature in the cavity of more than the ambient temperature, in particular of more than 50° C. and comprised between 70° C. and 120° C.

The measurement cell 14 is able to be introduced in the enclosure 20 and to be maintained in position in the enclosure 20, with its axis A-A' preferentially positioned vertically.

Each reference sample 18A 18B comprises a gauge block advantageously made of a dry mineral material, such as rock. The rock is for example chosen from sandstone, or carbonate, or any reservoir rock or source rock. The X-ray attenuation of the gauge block is close to the attenuation observed with the sample 12 contained in the measurement cell 14.

The composition of the gauge block is preferably similar to the composition of the sample 12.

In a variant, the reference sample 18A, 18B, is made of a different material, such as metal.

Each reference sample 18A, 18B is placed in the enclosure 20, between the respective X-ray source 22A, 22B, and the corresponding detector 24A, 24B, to be illuminated simultaneously with the measurement cell 14. It is positioned away from the measurement cell 14 and from the respective illumination axis B-B', C-C' so as to provide an image on the respective detector 24A, 24B which is distinct from the image of the measurement cell 14 and of the sample 12.

Preferentially, each reference sample 18A, 18B is fixed on a respective detector 24A, 24B.

The enclosure 20 defines a confinement volume 40 for confining the X-rays produced by each X-ray source 22A, 22B, and for receiving the sample measurement cell 14 and the reference sample 18. It comprises absorbent walls 42 for example made of lead.

The volume of the enclosure 20 is generally comprised between 0.5 m³ and 2 m³. The walls 42 of the enclosure define at least one opening 44 closed by at least a door 46 (see FIGS. 4 and 5).

In the embodiment shown in FIG. 2, each X-ray source 22A, 22B is equipped with a shutter assembly 48 for controlling the emission of X-rays into the confinement volume 40 towards the measurement cell 14. Each detector 24A, 24B is equipped with a shield assembly 50, for protecting the measurement cell 14 and the other detector 24B, 24A from reflective X-rays.

The shutter 48 comprises a shutting plate 52 mobile between a position preventing X-rays emitted by the X-ray source 22A, 22B to illuminate the measurement cell 14 and a position allowing passage of X-rays emitted by the X-ray source 22 to illuminate the measurement cell 14.

Hence, each X-ray source 22A, 22B can remain permanently active. By "permanently active", it is meant the X-ray source 22A, 22B is able to continuously emit a photon flux during the time of at least one measurement, preferentially of several measurements of the sample 12. The source for example remains active more than one day, preferentially more than one month. It shoots photons at any time when it is active.

The shutting plate 52 is moved in its preventing position when an access to the confinement volume 40 is needed. The measurement cell 14 can then be introduced into the enclosure 20, without having to shut down the X-ray sources 22A, 22B, which maintains the stability of each X-ray source 22A, 22B.

The shield assembly 50 for example comprises, for each detector 24A, 24B, at least a partition 59 located on a side of the detector 24A, 24B to shield the detector 24A, 24B from reflective X-rays arising from the other detector 24A, 24B, from the walls 42 of the volume 40 or/and from other parts of the volume 40.

In the example of FIG. 5, the shield assembly 50 comprises, for each detector 24A, 24B, two lateral parallel partitions 59 protruding from the detector 24A, 24B towards the measurement cell 14. Advantageously, the partitions 59 of each detector 24A, 24B converge towards the respective illumination axis B-B', C-C' away from the detector 24A, 24B, in at least a plane perpendicular to the cell axis A-A'.

The reference sample 18A, 18B is here located between one partition 59 and the detector 24A, 24B.

The tray 17B is mounted rotatable around the cell axis A-A'. It is able to rotate around the measurement cell 14, the measurement cell 14 remaining still.

The angular rotation of the tray 17B is for example extendible over a range of rotation angles around the axis A-A' comprised between 350° and 380°, preferentially about 360°. It is thus possible to obtain an image of the illuminated sample 12 at each angular orientation around the axis A-A', with at least one of the detectors 24A, 24B, preferentially two images of the illuminated sample 12 at each angular orientation around the axis A-A', each of the two images being obtained with one specific detector 24A, 24B.

The sources 22A, 22B and the detectors 24A, 24B being carried by the tray 17B are able to jointly rotate with the tray 17B around the cell axis A-A' without relative movement of the sources 22A, 22B and of the detectors 24A, 24B relative to the tray 17B.

Preferentially, the rotation of the tray 17B is piloted by a drive unit 54 that is able to rotate the tray 17B to at least one chosen angular measurement position around the axis A-A', preferentially to a plurality of successive chosen angular measurement positions around the axis A-A' and to maintain the tray 17B in that position during the carrying out of a measurement.

In this example, the tray 17B is asymmetric in regard to the cell axis A-A', meaning that it does not possess a central symmetry around the axis A-A'. In this example, the tray 17B has a polygonal outer contour defining the sides of the tray 17B. This makes the tray lighter and more compact, thus increasing the accuracy of the angular displacement of the tray 17B around the cell axis A-A'.

In a variant, the tray 17B may be symmetric around the axis A-A', in particular may have a circular contour centered on axis A-A'.

Each X-ray source 22A, 22B comprises a X-ray generator 60 (shown in FIG. 2 for source 22A) able to produce a respective beam 62A, 62B of X photons to illuminate the sample 12 contained into the measurement cell 14, the through orifice 36 in the calibration block 35 and the reference cell 18 along the respective illumination axis B-B', C-C'.

Each X-ray source 22A, 22B further comprises a tension and current controller 64 to supply electrical power to the generator 60 and thus to control the energy of the X photons emitted in each respective beam 62A, 62B

Each beam 62A, 62B is able to illuminate at least a surface of the porous sample 12, advantageously at least a volume of the porous sample 12 and preferably the whole porous sample 12, without relative movement between the X-ray source 22A, 22B and the porous sample 12.

The terms "at least a surface of the sample" and "at least a volume of the sample" mean that the illumination is not punctual. The surface of the sample 12 illuminated by the beam 62A, 62B is generally greater than 0.01 cm$^2$. The volume of the sample 12 illuminated by the beam 62A, 62B is generally greater than 0.01 cm$^3$. Advantageously, each beam 62A, 62B is able to totally illuminate the sample 12.

The horizontal aperture angle α and the vertical aperture angle β of each beam 62A, 62B are set so that the whole zone of interest including the sample 12 and the reference sample 18A, 18B is irradiated simultaneously. These angles α, β are limited to that zone to reduce at maximum scattering radiations.

The X-ray sources 22A, 22B are preferentially hyperstable. The term "hyperstable" generally means that the number of X-photons produced by the source 22A, 22B in a given solid angle is substantially constant along time.

The variation of the average number of X-photons per second produced by the source 22A, 22B is for example equal to a nominal value plus or minus 0.5% along time. The average number of X-photons can be measured with an ionizing chamber taking into account the environmental corrections.

The X-ray source 22A, 22B is usually hyperstable when the nominal voltage of the generator 60 is below 80% of the nominal power of the generator 60.

For example, when the nominal power of emission of the generator 60 is equal to 200 kV, the generator 60 produces a stable number of photons as a function of time at a power of emission up to 160 kV.

The power of emission is defined here by the voltage applied to the generator 60. This high voltage is for example comprised between 60 kV and 160 kV, in particular between 80 kV and 140 kV.

The generator 60 is for example an integral assembly made of one block such as a generator marketed under the reference GXC-200 by X-Ris.

A generator 60 of this type generally comprises an integral air cooler.

In a variant, the generator 60 is made of separate elements such as a generator marketed under the reference GXC-130 by X-Ris.

In the example of FIG. 2, the generator 60 advantageously comprises a X-ray tube 66 (e.g. a glass tube or a ceramic tube) and a temperature controller 68 able to control the temperature of the X-ray tube 66.

The X-ray tube 66 comprises a metal filament, notably a tungsten filament and is constantly heated so that the electron flux is constant and stable. The tube 66 is designed so that no grid effect can influence the electron beam trapped on the insulator.

The temperature controller 68 comprises for example a cooling fluid able to circulate in a double wall 70 located around the X-ray tube 66. The temperature of the tube 66 is for example maintained at a target temperature between 25° C. and 35° C.

The tension and current controller 64 is able to produce a stabilized current and tension to supply the generator 60. Advantageously, during more than 1 hour, in particular during several hours, the variation of tension is smaller than 0.1% (in kV) and the variation in intensity is smaller than 1% (in mA).

The X-ray sources 22A, 22B are able to simultaneously emit the first beam 62A and the second beam 62B towards the measurement cell 14 and the respective detector 24A, 24B.

They are able to simultaneously emit each beam 62A, 62B at each angular measurement position of the tray 17B around axis A-A'. Thus, at any time, the first detector 24A is able to receive the first beam 62A arising from the first source 22A having passed through the measurement cell 14 and the porous sample 12. Simultaneously, the second detector 24B is able to receive the second beam 62B from the second source 22B, having passed through the measurements cell 14 and the porous sample 12.

The tension and current controller 64 of each source 22A, 22B can be controlled simultaneously to simultaneously provide beams 62A, 62B having the same energy.

By "having the same energy", it is meant that the maximum energy of the photons provided by the respective sources 22A, 22B are identical. In that case, the tensions provided to both generators 60 are identical.

In an alternate mode of operation of the X-ray sources 22A, 22B, the tension and current controllers 64 of the two sources 22A, 22B are controlled to simultaneously provide a first electron beam 62A and a second electron beam 62B having different energies.

By "having different energies", it is meant that the maximum energy of the photons of the first beam 62A is different from the maximum energy of the photons of the second beam 62B.

This difference of energy is preferentially at least of 10% of the lowest maximum energy.

The tension provided to the generators 60 of the two sources 22A, 22B are therefore different.

For example, the photons of the first beam 62A may have a maximum energy of 120 keV, while the photons of the second beam 62B may have a maximal energy of 100 keV.

This mode of operation allows the determination of the phase content in three phases of the sample 12 at each measured position in the sample 12, as it will be described below.

In reference to FIG. 3, each detector 24A, 24B comprises an array of sensing areas 80 able to selectively detect X-rays arising from the corresponding source 22A, 22B potentially having passed through the sample 12 and through the corresponding reference sample 18A, 18B.

In the example of FIG. 4, the detector 24A, 24B comprises a flat panel 82 carrying an array of sensing areas 80 defining pixels in the flat panel 82. The flat panel 82 is for example a planar amorphous silicon flat panel, marketed under the name DEREO WA. The detector advantageously comprises a temperature control unit 82A (see FIG. 2) controlling the temperature of the flat panel 82.

Each pixel formed by a sensing area 80 is able to selectively receive a number of X-photons arising from the source 22A, 22B, corresponding selectively to a particular position in a projection of the sample 12 in a vertical plane perpendicular to the respective illumination axis B-B', C-C' or in alternative, to a particular position in the trough orifice 36 of the calibration block 35 or to a particular position in the reference sample 18, or in another alternative, to a position outside of the samples 12, 18.

At any measurement time, each sensing area 80 is able to sense the number of X-photons received during a sampling interval for example smaller than 15 s, generally around 10 s and potentially comprised between 0.5 s and 10 s.

The number of X-photons received by each sensing area 80 is sensed data representative of the absorbance of the signal at the position detected by the sensing area 80.

The number of X-photons provides a level of grey in a radiographic image 83A, 83B of the beam 62A, 62B after its passage through the sample 12, or through the trough orifice 36 of the calibration block 35 or through the reference sample 18 or through the confinement volume 40 away from the sample 12 and from the reference sample 18.

Two images 83A, 83B representing the level of gray at different positions on the sample 12, in the trough orifice 36 of the calibration block 35 and on the reference sample 18 in two planes perpendicular to the respective illumination axis B-B', C-C' can be obtained simultaneously at a given measurement time by the detectors 24A, 24B, based on the signals produced by each sensing area 80 of each detector 24A, 24B.

In the region of the image 83A, 83B, corresponding to X photons having passed through the sample 12, each pixel is representative of the absorbance of the X-ray beam 62A, 62B having passed through the sample 12 at the corresponding position in a projection of the sample 12 in a respective vertical plane.

The analyzing unit 26 comprises a calculator 90 having a processor 92 and a memory 94, and a man/machine interface 96.

The memory 94 contains software applications which can be executed in the processor 92. Among the software applications, the memory 94 contains at least one software module able to receive, at each measurement time, a signal representative of the number of photons measured by each sensing area 80 for each orientation of each detector 24A, 24B around the cell axis A-A'.

The memory 94 further contains a software module able to calculate at least a property of the fluid contained in the porous medium at a particular position in the sample 12, for example a proportion in two phases of the fluid or preferentially in three phases of the fluid in case the beams 62A, 62B have different energies.

The calculation is based on the sensed signal produced by the sensing areas 80 at each angular orientation around the cell axis A-A' at which measurements have been collected. It is also based on at least one reference image, and preferentially based on two reference images in which a correlation is made between the property and the signal at each position. It is also advantageously based on a signal produced by a sensing area 80 receiving X-rays arising from the reference sample 18.

The memory 94 also contains a software module able to display on the man/machine interface 96 a representation of the fluid property (here the proportion in each phase) at each position of the sample 12 corresponding to a sensing area 80, at a given measurement time.

In some cases, when successive measurements of the whole sample 12 are carried out, the software module is also able to display a curve of the evolution of the fluid property along time at a particular position in the sample 12.

The local proportions of the phases in the fluid at the different positions are displayed with a color scale, showing the impregnation of the fluid.

In the particular example of a measurement carried out with two X-ray sources 22A, 22B emitting at two different energies, and illuminating the sample at the same successive angular orientations around the cell axis A-A', the saturations $S_w$, $S_o$, and $S_g$ respectively in water, oil, and gas can be calculated, based on Beer Lambert Law according to the following equations:

$$I_1 = I_{dry\,sample\,1} * e^{\left(-\mu 1_o * \Phi * d * S_o - \mu 1_w * \Phi * d * S_w - \mu 1_g * \Phi * d * S_g\right)} \qquad (a)$$

$$I_2 = I_{dry\,sample\,2} * e^{\left(-\mu 2_o * \Phi * d * S_o - \mu 2_w * \Phi * d * S_w - \mu 2_g * \Phi * d * S_g\right)} \qquad (b)$$

$$(c)\, S_w, + S_o + S_g = 1, \qquad (c)$$

In which $I_1$ and $I_2$ are the intensities measured in the presence of the fluid respectively with beams 62A, 62B of different energies, $I_{dry\ sample\ 1}$ and $I_{dry\ sample\ 2}$ are the intensities measured with beams 62A, 62B of different energies with a dry sample during the collection of a reference image, $\mu1_o$, $\mu1_w$, $\mu_g$, $\mu2_o$, $\mu2_w$, and $\mu2_g$ are the attenuation coefficients corresponding to the phases measured at the two energies, d is the sample diameter and Ø is the sample porosity.

The attenuation coefficients are preferably determined based on the measurements made when collecting the reference images, at the position of the through cavity 36 of the calibration block 35, respectively when it is filled solely with air, and when it is filled with a sole liquid, in particular water or oil.

A method for measuring and analyzing a fluid in a sample of porous medium 12 according to the invention will be now described.

The method is carried out in the device 10 previously described, in view of FIGS. 1 to 6.

Initially, each source 22A, 22B is supplied with a stabilized current and tension arising from the respective tension and current controller 64. Each generator 60 is permanently powered and stabilized to produce a respective beam 62A, 62B of X photons. In a first embodiment, the generators 60 are controlled such that the beams 62A, 62B have different energies.

The sample 12 is then inserted into the measurement cell 14. The measurement cell 14 is sealed.

The shutter plates 52 are in their position for preventing the beam 62 to illuminate the measurement cell 14. The enclosure 20 is opened to access the volume 40.

The measurement cell 14 is put in place in the enclosure 20. In the example of FIG. 1, the measurement cell 14 is positioned with its axis A-A' vertical. The axis of each reference sample 18A, 18B is also vertical.

The measurement cell 14 is then connected to the unit 16 for controlling temperature and pressure to set a measurement target temperature and a measurement target pressure in the measurement cell 14.

The measurement target temperature is for example set between 0° C. and 160° C. and the measurement target pressure is set between 1 bar and 800 bars.

Once the temperature and pressure of the sample 12 are stable, the shutter plates 52 are placed in the position for illuminating the measurement cell 14 with each X-ray beam 62A, 62B.

A first measurement in the absence of fluid is then carried out. The drive unit 54 is activated to jointly rotate the tray 17B, the sources 22A, 22B, and the detectors 24A, 24B carried by the tray 17B to successively occupy a plurality of angular measurement positions around the cell axis A-A'.

At each angular measurement position, the drive unit 54 immobilizes the tray 17B. Each beam 62A, 62B has a particular orientation around the cell axis A-A'. A reference image of the sample 12 providing reference signals at each position of the sample 12 corresponding to a sensing area 80 is obtained.

When the rotation of the tray has reached 360° around the rotation axis, the sample has been illuminated at each angular measurement position a first time with the first beam 62A and a second time with the second beam 62B to obtain reference images 82 at two different energies.

Then, fluid is progressively injected into the sample 12.

Just as before, the drive unit 54 is activated to jointly rotate the tray 17B, the sources 22A, 22B, and the detectors

24A, 24B carried by the tray 17B to successively occupy the plurality of angular measurement positions around the cell axis A-A'.

At each angular measurement position, the drive unit 54 immobilizes the tray 17B. Each beam 62A, 62B has then a particular orientation around the cell axis A-A'.

Each beam 62A, 62B illuminates the sample 12 contained in the measurement cell 14, the reference sample 18 and the volume surrounding these samples 12, 18. The detectors 24A, 24B are activated to measure, at each sensing area 80, a signal representative of the number of counts of X photons having been transmitted through the porous sample 12, the reference sample 18 and the surrounding area.

Two images 83A, 83B, as shown in FIG. 6 are created at each angular measurement position, with pixels corresponding to a particular position in the sample 12. All the positions which have been illuminated of the sample 12 are measured simultaneously, which allows building a map of fluid properties in the sample at each angular measurement position.

When the rotation of the tray has reached 360° around the rotation axis, the sample has been illuminated at each angular measurement position a first time with the first beam 62A and a second time with the second beam 62B to obtain images 83A, 83B at two different energies.

Then, the analyzing unit 26 gathers the signals obtained at each sensing area 80 of each detector 24A, 24B at each measurement orientation, deletes the contribution resulting from the porous medium, based on the reference measurements and based on the measurement in the reference sample 18, and extracts at least an information representative of a fluid property at each position in the sample 12, in projection in a plane perpendicular to the particular orientation of the beam axis B-B', C-C' at the particular angular measurement position.

Based on a mathematical model, the analyzing unit 26 then calculates the fluid property at each tridimensional position in the sample 12, for example the proportions in at least the gas phase and the water phase and the oil phase at each tridimensional position.

The scanning of the sample 12 including a full rotation around the cell axis A-A' generally takes between 20 minutes and 4 hours.

The same steps can then repeated at further measurement times, in order to determine the evolution of the fluid local properties as a function of time at each position in the sample.

The evolutions can then be recorded and displayed.

In a variant, when only the proportions in two phases have to be obtained, and in which measurement time has to be reduced, the generators 60 control the respective X-ray sources 22A, 22B to operate at the same energies. In that case, the drive unit 54 only rotates the tray 17B carrying the X-ray sources 22A, 22B and the detectors 24A, 24B over half a turn around the cell axis A-A'. The images collected at each angular position at the two orientations of the illumination axis B-B' and C-C' are used to analyzing unit 26 to calculate the fluid properties at each tridimensional position in the sample.

This embodiment reduces the measurement time by half.

In another variation, when the dynamics of the fluid must be studied with great precision, the drive unit 54 does not rotate the tray 17B, the latter remaining still. The successive measurements at two angular positions are obtained and used to determine the evolution of the local properties of the fluid in two dimensions on two different planes, as a function of time.

Thanks to the device 10 according to the invention, it is thus possible to obtain, in a quick, efficient and safe manner, a full assessment of the tridimensional properties of a sample 12, when the sample is impregnated with fluid. When the X-ray sources 22A, 22B emit at different energies, it is possible to simultaneously collect two different images at each angular position, without having to move the source 22A, 22B or the detector 24A, 24B at each angular position and using a simple detector, which does not possess the ability to spectrally discriminate among the energies.

A precise assessment of fluid properties, in particular of fluid phase compositions at each position in the sample can then be obtained easily by a mathematical modeling. The experiment is fast to operate, allowing the observation of the dynamics of the fluid impregnation.

The device 10 according to the invention has the great advantage over a system in which one generator is used with a spectral detector. Generally, spectral detectors are only linear or punctual. This requires moving the detector and the source to scan the sample at each angular position measurement. The acquisition time is therefore greatly reduced with the device 10 according to the invention.

The device 10 according to the invention is also very efficient in comparison to a device in which a single X-ray source associated with a bi-dimensional detector would be used. In that case, to obtain composition in three phases at each region of the sample 12, a modification of the source energy would be necessary at each angular measurement position, which would greatly lengthen the experiment time and affect the stability of the measurement due to source instability. On the contrary, the device 10 according to the invention having two sources permanently active at two different energies, each source keeping its own energy during the whole span of the experiment, produces very stable beams 62A, 62B without having to modify the parameters of the generator 60. The measurements are reproducible and precise.

Thanks to the device 10 according to the invention, the use of contrast agent(s) is not necessary to distinguish the different phases. The experimental conditions are not disturbed by contrast agent, even with a sample of a diameter up to 100 mm, fitted into an attenuating measurement cell. The results realistically mimic the fluid behavior in an underground formation.

As explained above, the device 10 according to the invention can be also used in a degraded mode, for example by using the two sources 22A, 22B at the same energy to reduce the acquisition time, or/and by maintaining the tray 17B still to obtain a bi-dimensional measurement evolving with time, in two planes.

In an embodiment, described in reference to FIGS. 2, 7 and 8, the analysis unit 26 is able to determine at each successive angular position γ of the tray 17B around the cell axis, for each of the first detector 24A and of the second detector 24B, at least a bi-dimensional map 200A, 200B, 200C of fluid composition in the sample 12 from the images 83A, 83B of intensities obtained at each successive angular position γ.

According to a preferred embodiment, the analysis unit 26 is further able to determine a three-dimensional map of fluid composition at each position x, y, z in the sample 12, from the successive bi-dimensional maps 200A, 200B, 200C of fluid compositions in the sample, as will be described below.

For example, the bi-dimensional map 200A, 200B, 200C corresponding to a particular orientation γ around the cell axis A-A', is a map of saturation in one fluid, in particular oil.

The saturation in oil $S_o$ at each pixel of the map 200A, 200B, 200C is determined according to the following formula in a two phase system comprising oil and water:

$$S_o = S_{oi} + \frac{\ln I_{oi1} - \ln I_1}{\ln I_{dry\,sample\,1} - \ln I_{0w1}} \times \frac{\mu_{1w}}{\mu_{1o} - \mu_{1w}}$$

In which $S_{oi}$ is a reference saturation in oil (for example taken when the sample is solely filled with oil or when a calibration block with an known oil saturation is used), $I_{oi1}$ is the intensity of the same pixel measured at the reference saturation in oil, $I_1$ is the intensity of the pixel in the image 83A, 83B, $I_{dry\,sample\,1}$ is the intensity of the same pixel in the dry sample, $I_{0w1}$ is the intensity of the same pixel in the sample saturated solely with water, $\mu_{1\,w}$ is the attenuation coefficient corresponding to water and $\mu_{1\,o}$, is the attenuation coefficient corresponding to oil.

In a three phase system comprising oil, water and gas, the above mentioned equations (a), (b), (c) are used to determine the saturation in oil $S_o$ at each pixel of the map 200A, 200B, 200C.

The term φ.d in these equations is given by the following equation $$\phi.d = \frac{\ln I_{dry\,sample\,1} - \ln I_{0w1}}{\mu_{1w}}.$$

The analysis unit 26 is able to construct the three-dimensional map by back projecting the successive bi-dimensional maps 200A, 200B, 200C in the sample volume and by summing the back projected intensities in the sample volume.

The principle of the calculation is illustrated in FIG. 8 in a cross sectional plane taken perpendicular to the cell axis A-A', at a particular height along the sample 12. For the sake of illustration, the sample 12 is taken to have a cross-section with a square contour. It schematically has a center zone (in white) with a saturation of 1 and peripheral zone with a null saturation.

The curves 202A, 202B, 202C illustrate an example of fluid composition varying along the bi-dimensional maps 200A, 200B, 200C taken at several orientations as shown in drawing (i).

At each orientation, the saturation computed at each pixel in the map 200A, 200B, 200C corresponds to the fluid content in contact with the X-photons from the beam 62A, 62B at this particular orientation. It has a value comprised between 0 and 1.

In the schematic example of curve 202A the photons on the sides 204, 206 have only crossed a region of saturation equal to 0 (see arrow P1 in (i) of FIG. 8), hence the value of 0. The photons in the center region 208 have crossed a region of saturation equal to 0, then a region of saturation equal to 1, followed by a region of saturation equal to 0 (see arrow P2 in (i) of FIG. 8). The overall saturation is therefore comprised between 0 and 1.

The back projection of a first map 200A at a first orientation γ1 in the sample volume 210 is illustrated in drawing (ii) of FIG. 8. The saturation of the side regions 204, 206 and of the center region 206 is extended in the sample volume 210 along the direction D1 of the illumination at this particular orientation γ1.

Then, the back projection of a second map 200C at a second orientation γ2 in the same sample volume 210 is illustrated in drawing (ii) of FIG. 8 and is summed with the back projection of the first map 200A.

The back projection of the third map 200B at a third orientation γ3 in the same sample volume 210 is illustrated in drawing (iii) of FIG. 8 and is summed with the back projection of the first map 200A and the back projection of the second map 200C.

The saturation at each voxel corresponding to a pixel in each map 200A, 200B, 200C, in the sample volume 210 is hence calculated from the sum of the saturations of the back projections of the maps 200A, 200B, 200C.

In a preferred embodiment, the analysis unit 29 has a calculator able to carry out the calculation as follows.

First, the saturation determined at each pixel of each map 200A, 200B is considered to be the projection $p_{\gamma,\theta}(\xi)$ corresponding to a particular orientation γ of the beam 62A, 62B, as shown in FIG. 7.

The angles γ, θ define the orientation of the vector $\vec{\xi}$ whose norm is ξ at the position of the plane of the detector 24A, 24B.

The Fourier transform $\mathcal{F}$ of the projection $p_{\gamma,\theta}(\xi)$ is calculated according to the following equation:

$$P_{\gamma,\theta}(q) = \mathcal{F}\{p_{\gamma,\theta}(\xi)\}$$

An unfiltered back projection R at each orientation γ corresponding to a bi-dimensional map 200A, 200B, 200C is then calculated by the following operator:

$$R(\gamma) = \frac{1}{2} \times \int_0^\pi \int_{-\infty}^{+\infty} P_{\gamma,\theta}(q) \times e^{2i\pi q\xi} \times \sin\theta \, dq \, d\theta$$

The reconstruction of the saturation S(x, y, z) at each position x, y, z is then calculated as:

$$S(x, y, z) = \int_0^{2\pi} R(\gamma) d\gamma.$$

Generally, the number N of bi-dimensional maps 200A, 200B, 200C to carry out the above integration is greater than 25. It is for example greater than 40 and advantageously comprised between 40 and 60.

In summary of the method, several images 83A, 83B of the sample 12 are taken at various orientations γ(i).

As explained above, the analysis unit 29 then determines, for each image 83A, 83B a bi-dimensional map 200A, 200B, 200C of fluid composition, in particular of oil saturation at each orientation γ(i).

Subsequently, for each bi-dimensional map 200A, 200B, 200C, the analysis unit 29 successively calculates the Fourier transform F of the projection $p_{\gamma,\theta}(\xi)$, the back projection R at each orientation γ(i) and finally integrates the back projections at the different orientations to reconstruct the saturations S(x, y, z), using the above-mentioned equations.

The above-mentioned method is therefore very simple. It alleviates the need of reconstructing a tridimensional image of intensities from each bi-dimensional image 83A, 83B.

Indeed, the cone beam 62A, 62B is not as well suited as a fan beam for the exact determining of the Houndsfield units. Moreover, the large size (e.g. 200 mm) of the sample 12 linked to the circular trajectory of the source 22A, 22B and detector 24A, 24B does not allow a uniform reconstruction quality of intensities over its entire height, according to Tuy's condition. The latter expresses that in order to be able to obtain a theoretically perfect reconstruction, any plane passing through the sample 12 to be imaged must contain the source. For a circular trajectory of the latter, any parallel plane to the path described by the source 22A, 22B violates this condition. In particular, the calibration block is located in the region presenting the poorest precision for the reconstruction.

In addition, numerous artefacts (in particular cone artefact, beam hardening, reconstruction error) taint the reconstructed volume and make a precise determination very difficult to obtain.

On the contrary, the above-mentioned method is a 3D construction, which directly uses bi-dimensional composition maps 200A, 200B 200C to reconstruct the composition at any voxel in the sample 12.

Unlike classical CT reconstruction algorithms which require knowledge of multiple geometric parameters (e.g. source-detector distance, source-center of rotation distance, horizontal and vertical shifts of the detectors, inclination of the detectors), the above-mentioned method merely takes as input only a limited number N of bi-dimensional composition maps 200A1, 200B, 200C.

In the above-mentioned method, the projections are made in conical geometry (cone beam 62A 62B) while the unfiltered back projection is carried out assuming a parallel beam geometry. This surprisingly allows direct comparison of 2D maps to 3D maps. Even if a slight loss of geometrical description occurs, it is not essential in the interpretation of the results.

It has to be noted that the above-mentioned method can be carried out from any set of composition bi-dimensional maps 200A, 200B, 200C taken at different orientations γi, not necessarily obtained with a device 10 having two sources 22A, 22B, and two detectors 24A, 24B. In an example, the bi-dimensional maps 200A, 200B, 200C are rather obtained with a device having a single source 22A and a single detector 24A, the source 22A and detector 24A or/and the sample 12 being rotatable around the cell axis A-A'.

The invention claimed is:

1. A device to analyze a fluid in a sample, comprising:
   a measurement cell configured to receive a sample of a porous medium containing a fluid comprising one or more phases, the measurement cell extending along a cell axis;
   a first X-ray source, configured to illuminate the measurement cell with a first beam of X photons, the first beam extending along a first illumination axis;
   a first detector, placed opposite the first X-ray source along the first illumination axis, the measurement cell being interposed between the first X-ray source and the first detector, the first beam being configured to illuminate a volume of the sample without relative movement between the first X-ray source and the sample, the first detector comprising a plurality of sensing areas configured to detect X photons arising from different points in the volume of the sample;
   a second X-ray source, configured to illuminate the measurement cell with a second beam of X photons simultaneously with the first X-ray source, the second beam extending along a second illumination axis distinct from the first illumination axis;
   a second detector, placed opposite the second X-ray source along the second illumination axis, the measurement cell being interposed between the second detector and the second X-ray source, the second X-ray source being configured to illuminate a volume of the sample, without relative movement between the second X-ray source and the sample, the second detector comprising a plurality of sensing areas configured to detect X-rays arising from different points in the volume of the sample, simultaneously with the first detector; and a tray carrying the first X-ray source, the first detector, the second X-ray source, and the second detector, the tray being rotatable around the cell axis.

2. The device according to claim 1, wherein the tray is rotatable around the cell axis over an angular range smaller than 380°.

3. The device according to claim 1, wherein the first X-ray source comprises a first controller, configured to control the energy of the X photons of the first beam to a first maximum energy, and the second X-ray source comprising a second controller, configured to control the energy of the X photons of the second beam to a second maximum energy distinct from the first maximum energy.

4. The device according to claim 1, wherein the first beam and the second beam are configured to illuminate the whole sample contained in the measurement cell without relative movement between the first and second X-ray sources and the sample, the sensing areas of the first detector and the second detector being configured to detect X-rays arising from points spread in the volume of the sample and outside the sample.

5. The device according to claim 1, wherein the first X-ray source and the second X-ray source are permanently active.

6. The device according to claim 1, wherein the fluid comprises at least a liquid phase and a gas phase, the device comprising an analyzer configured to determine a phase composition of the fluid at a plurality of positions in the sample, based on signals simultaneously detected by sensing areas of the first detector and the second detector.

7. The device according to claim 6, wherein the analyzer comprises a calculator configured to acquire sensed data detected by sensing areas of the first detector and the second detector taken at successive angular measurement positions of the tray around the cell axis and to form a three-dimensional map of fluid composition in the sample based on the sensed data acquired at the successive angular measurement positions of the tray.

8. The device according to claim 7, wherein the analyzer is configured to determine at each successive angular position of the tray around the cell axis, for each of the first detector and the second detector, at least a bi-dimensional map of fluid composition in the sample from the sensed data, the three-dimensional map of fluid composition in the sample being obtained from the successive bi-dimensional map of fluid composition in the sample.

9. The device according to claim 8, wherein the analyzer is configured to calculate a back projection of each bi-dimensional map at each angular position in the volume occupied by the sample and to integrate the calculated back projections into the volume occupied by the sample to obtain the three-dimensional map.

10. The device according to claim 1, wherein the first detector and the second detector each comprise a bi-dimensional array of sensing areas configured to selectively detect X photons arising from different points in the volume of the sample without relative movement between the first and second X-ray sources and the sample.

11. The device according to claim 1, wherein at least one of the first detector and the second detector comprises a shield to attenuate diffused photons arising from the at least one of the first detector and the second detector.

12. The device according to claim 1, wherein the measurement cell contains, in addition to the sample, at least a calibration block having a through orifice configured to be filled with the fluid which flows in the measurement cell to impregnate the sample and/or which flows out of the measurement cell from the sample, the first beam and the second beam being configured to illuminate the through orifice simultaneously with the sample without relative movement between the first X-ray source, the second X-ray source and the sample.

13. A method to analyze a fluid in a sample, comprising:

providing a device according to claim 1, the measurement cell containing a sample of porous medium containing a fluid;

simultaneously illuminating at least a volume of the sample by the first beam and by the second beam, at least one angular measurement position of the tray around the cell axis;

selectively detecting X-rays arising respectively from the first beam and from the second beam at a plurality of sensing areas respectively of the first detector and the second detector to obtain first sensed data sensed by the first detector and second sensed data sensed by the second detector; and determining a local property of the fluid at a plurality of positions in the sample, based on the first sensed data and the second sensed data.

14. The method according to claim 13, comprising rotating the tray at a plurality of successive angular measurement positions around the cell axis, and for each angular measurement position repeating:

simultaneously illuminating at least a volume of the sample by the first beam and by the second beam;

selectively detecting X-rays arising respectively from the first beam and from the second beam at a plurality of sensing areas of respectively the first detector and the second detector to obtain the first sensed data sensed by the first detector and the second sensed data sensed by the second detector; and the method comprising calculating a local property of the fluid at a plurality of three-dimensional positions in the sample, based on the first sensed data and the second sensed data obtained at the plurality of successive angular measurement positions.

15. The method according to claim 14, wherein the device comprises an analyzer, the analyzer determining a phase composition of the fluid at a plurality of positions in the sample, based on the first sensed data and the second sensed data simultaneously detected by sensing areas of the first detector and the second detector, the analyzer comprising a calculator forming a three-dimensional map of fluid composition in the sample based on the signals acquired at the successive angular measurement positions of the tray, and the calculator determining at each successive angular position of the tray around the cell axis, for each of the first detector and the second detector, at least a bi-dimensional map of fluid composition in the sample, the three-dimensional map of fluid composition in the sample being obtained from the successive bi-dimensional map of fluid composition in the sample.

16. The method according to claim 15, wherein the calculator calculates a back projection of each bi-dimensional map at each angular position in the volume occupied by the sample and integrates the calculated back projections into the volume occupied by the sample to obtain the three-dimensional map.

17. The method according to claim 13, comprising acquiring, at successive measurement times, the first sensed data from the first detector, and the second sensed data from the second detector, without rotation of the tray around the rotation axis.

18. The method according to claim 13, comprising controlling the first X-ray source to emit the first beam having a first maximum energy, and simultaneously controlling the second X-ray source to emit the second beam with a second maximum energy different from the first maximum energy, the method further comprising determining a composition in at least three phases of the fluid, at a plurality of positions in the volume of the sample based on the first sensed data and the second sensed data.

19. A device for analyzing a fluid in a sample, comprising:
a measurement cell configured to receive a sample of a porous medium containing a fluid comprising one or more phases, the measurement cell extending along a cell axis;
a first X-ray source, configured to illuminate the measurement cell with a first beam of X photons, the first beam extending along a first illumination axis;
a first detector, placed opposite the first X-ray source along the first illumination axis, the measurement cell being interposed between the first X-ray source and the first detector, the first beam being configured to illuminate at least a volume of the sample without relative movement between the first X-ray source and the sample, the first detector comprising a plurality of sensing areas capable of detecting X photons arising from different points in the volume of the sample;

the first X-ray source and the first detector being rotatable with regards to the measurement cell around the cell axis;
the fluid comprising at least a liquid phase and a gas phase, the device comprising an analyzer configured to determine a composition of the fluid at least in the liquid phase and the gas phase at a plurality of positions in the sample, based on sensed data detected by sensing areas of the first detector;
the analyzer comprising a calculator configured to acquire the sensed data detected by sensing areas of the first detector, taken at successive angular measurement positions around the cell axis, the calculator being configured to determine at each successive angular position around the cell axis, at least a bi-dimensional map of fluid composition in the sample; and
the calculator being configured to form a three-dimensional map of fluid composition in the sample from the successive bi-dimensional map of fluid composition in the sample.

20. The device according to claim 19, wherein the analyzer is configured to calculate a back projection of each bi-dimensional map at each angular position around the cell axis, in the volume occupied by the sample and to sum the calculated back projections in the volume occupied by the sample to obtain the three-dimensional map.

* * * * *